(12) United States Patent
Aron et al.

(10) Patent No.: US 12,112,431 B2
(45) Date of Patent: Oct. 8, 2024

(54) THREE DIMENSIONAL MAPPING (71) Applicant: Quantarium Group, LLC, Bellevue, WA (US)

(72) Inventors: Andrei T. Aron, Woodinville, WA (US); Bo Pintea, Seattle, WA (US); Yankang Chen, Anhui (CN); Clement Ifrim, Sammamish, WA (US); Ioan Smintina, Kirkland, WA (US)

(73) Assignee: Quantarium Group, LLC, Bellevue, WA (US)

( * ) Notice: Subject to any disclaimer, the term of this patent is extended or adjusted under 35 U.S.C. 154(b) by 91 days.

(21) Appl. No.: 17/827,053

(22) Filed: May 27, 2022

(65) Prior Publication Data

US 2023/0410422 A1  Dec. 21, 2023

(51) Int. Cl.
| | |
|---|---|
| *G06T 15/00* | (2011.01) |
| *G06T 7/246* | (2017.01) |
| *G06T 7/73* | (2017.01) |
| *G06T 17/05* | (2011.01) |
| *H04N 23/63* | (2023.01) |

(52) U.S. Cl.
CPC ............. *G06T 17/05* (2013.01); *G06T 7/248* (2017.01); *G06T 7/74* (2017.01); *H04N 23/631* (2023.01); *G06T 2200/24* (2013.01); *G06T 2207/10016* (2013.01); *G06T 2207/20101* (2013.01); *G06T 2207/30244* (2013.01)

(58) Field of Classification Search
CPC ..... G06T 17/20; G06T 7/20; G06T 2219/004; G06T 2207/20081; G06F 19/00; G06F 7/50; G06F 7/80; G06F 7/0002; G06F 17/00; G06F 16/29; G06F 3/04815; G06F 18/24; G06F 18/2413; G06F 3/04842; G06F 3/0484
USPC ......................................................... 345/418
See application file for complete search history.

(56) References Cited

U.S. PATENT DOCUMENTS

| | | | |
|---|---|---|---|
| 11,263,460 B1 * | 3/2022 | Rattner | G06N 3/045 |
| 11,265,668 B1 * | 3/2022 | Patil | H04S 7/305 |
| 2020/0312028 A1 | 10/2020 | Charvat et al. | |

(Continued)

OTHER PUBLICATIONS

Brostow GJ, Shotton J, Fauqueur J, Cipolla R. Segmentation and recognition using structure from motion point clouds. InComputer Vision—ECCV 2008: 10th European Conference on Computer Vision, Marseille, France, Oct. 12-18, 2008, Proceedings, Part I 10 2008 (pp. 44-57). Springer Berlin Heidelberg.*

(Continued)

*Primary Examiner* — Phu K Nguyen (57) ABSTRACT

Systems and methods are disclosed for three dimensional mapping. In certain embodiments, a method may comprise executing a three dimensional mapping operation via a computing system, including capturing an image sequence of a plurality of physical surfaces via an image capture device, and receiving a user input corresponding to the image sequence, the user input identifying a location of a surface edge from the plurality of physical surfaces. The three dimensional mapping operation may further include identifying a plurality of feature points within the image sequence based on a projected light pattern on the plurality of physical surfaces, and generating a three dimensional map of the plurality of physical surfaces based on the image sequence, the user input, and the plurality of feature points.

20 Claims, 6 Drawing Sheets

(56) References Cited

U.S. PATENT DOCUMENTS

| | | |
|---|---|---|
| 2021/0183161 A1 | 6/2021 | Upendran et al. |
| 2021/0279957 A1 | 9/2021 | Eder et al. |
| 2023/0093087 A1* | 3/2023 | Babinowich ......... G06V 10/774 345/423 |

OTHER PUBLICATIONS

Gupta M, Agrawal A, Veeraraghavan A, Narasimhan SG. Structured light 3D scanning in the presence of global illumination. InCVPR 2011 Jun. 20, 2011 (pp. 713-720). IEEE.*

Geng J. Structured-light 3D surface imaging: a tutorial. Advances in optics and photonics. Jun. 30, 2011;3(2):128-60.*

Le MT, Chen LC, Lin CJ. Reconstruction of accurate 3-D surfaces with sharp edges using digital structured light projection and multi-dimensional image fusion. Optics and Lasers in Engineering. Sep. 1, 2017;96:17-34.*

Wang Y. (1991). Characterizing Three-Dimensional Surface Structures from Visual Images. IEEE Transactions on Pattern Analysis and Machine Intelligence. 13:1. (52-60). Online publication date: Jan. 1, 1991.*

Li, X. (2021). Robust 6-DOF Camera Relocalization in Multi-view Structure from Motion (Doctoral dissertation, Temple University. Libraries).*

International Application No. PCT/US2023/023434, International Search Report, Written Opinion, 7 pages, Aug. 28, 2023.

* cited by examiner

THREE DIMENSIONAL MAPPING

SUMMARY

In certain embodiments, a method may comprise executing a three dimensional mapping operation via a computing system, including capturing an image sequence of a plurality of physical surfaces via an image capture device, and receiving a user input corresponding to the image sequence, the user input identifying a location of a surface edge from the plurality of physical surfaces. The three dimensional mapping operation may further include identifying a plurality of feature points within the image sequence based on a projected light pattern on the plurality of physical surfaces, and generating a three dimensional map of the plurality of physical surfaces based on the image sequence, the user input, and the plurality of feature points.

In certain embodiments, a memory device may store instructions that, when executed, cause a processor to perform a method comprising generating a three dimensional map of a physical space. Generating the three dimensional map may include capturing an image sequence of a plurality of physical surfaces via an image capture device, identifying a plurality of feature points within the image sequence based on a projected light pattern on the plurality of physical surfaces, and generating the three dimensional map of the plurality of physical surfaces based on the image sequence and the plurality of feature points.

In certain embodiments, an apparatus may comprise a processor configured to execute a three dimensional mapping operation, including capture an image sequence of a plurality of physical surfaces via an image capture device, receive a user input corresponding to the image sequence, the user input identifying a location of a surface edge from the plurality of physical surfaces, and generate a three dimensional map of the plurality of physical surfaces based on the image sequence and the user input.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Methods and functions may be performed by modules or nodes, which may include one or more physical components of a computing device (e.g., logic, circuits, processors, etc.) configured to perform a particular task or job, or may include instructions that, when executed, can cause a processor to perform a particular task or job, or any combination thereof. Further, methods described herein may be implemented as a computer readable storage medium or memory device including instructions that, when executed, cause a processor to perform the methods.

The ability to build a 3-dimensional (3D) model or depiction of real-world space, such as the interior of a building, is useful for many reasons: creating blueprints and floorplans, counterfactual in-silico remodeling, sizing furniture, etc. With the proper equipment and software, a 3-dimentional representation of a space can be automatically generated or reconstructed based on photography and measurements taken of the real-world space. However, so far, there is a tradeoff between the 3D-reconstruction accuracy and the level of sophistication of the sensor or other capture equipment used to obtain the environmental data. Technical solutions may fall into two categories: 1) specialized sensors such as time-of-flight (e.g. LIDAR, light detection and ranging) or Structured Light, or 360-degree panoramic cameras, and 2) monocular cameras (e.g. regular smartphones), which can include cameras with multiple lenses in close proximity. The level of error for the reconstruction (e.g., regarding spacing and sizing of walls, doors, windows, etc.) of a single room goes up from centimeters for the high-end LIDAR solutions, all the way up to whole feet for the regular smartphone solutions. However, smartphone solutions represent a more desirable, democratized solution, requiring neither capital investment on the customer's side, nor the visit of a specialized worker to do the scanning.

One of the main problems with smartphone-scanning comes from the way it works: by using stereo vision techniques to recover depth and structure from camera images by comparing multiple views of the same scene. The techniques can include simultaneous localization and mapping (SLAM), visual SLAM (vSLAM), and structure-from-motion (SFM), used to estimate a 3D structure of an environment from a set of 2D images. Techniques such as SFM identifies features such as corners of doors or windows, pictures hanging on walls, or lights on the ceiling. It then tracks these features between images, such as when the user walks holding the smartphone camera, thus obtaining different viewpoints of the same features. This, in turn, allows reconstruction of both how the camera moved and turned and of where those features are situated in 3D space. This technique is in some ways similar to how human 3D vision works—by using 2 different views (one per eye) from slightly different vantage points, of the same objects. This is how 3D sensing is implemented on most iOS and Android devices.

SFM outputs a reconstruction of the path the camera took, how it was pointed, and a set of 3D points with respect to the camera position. It may be the task of a second algorithm in the stack to aggregate and assign these 3D points to individual features within the physical space that can be detected in the images, such as walls, windows, doors, corners, etc. However, this technique depends heavily on actually finding the features mentioned above within the images. On a featureless wall or ceiling, smartphone camera devices may have trouble detecting identifiable features within the images. Plane-finding algorithms may be used for two primary reasons: 1) to correct inaccuracies in the 3D points/camera path reconstructed by SLAM/SFM; and 2) to discern the walls' planes, for example to create 2D floor plans. Since the 3D points can have a high degree of error, simple plane-finding algorithms may not work well. In the absence of detailed spatial data, algorithms may make some assumptions about the structure of the space, such as "walls are flat planes" or "walls intersect in vertical lines." To enable accurate 3D reconstruction from simple sensor equipment such as smartphone cameras, it is important to be able to accurately identify key points and features in the environment, such as trackable features on walls and ceilings, and points where walls, ceilings, and floors meet. Onboard computer vision often cannot detect such key points accurately.

Accordingly, systems and techniques are provided herein which can enable superior detection of environmental features, and thereby improve 3D environmental mapping and reconstruction without the need for sophisticated equipment.

Figure 1:
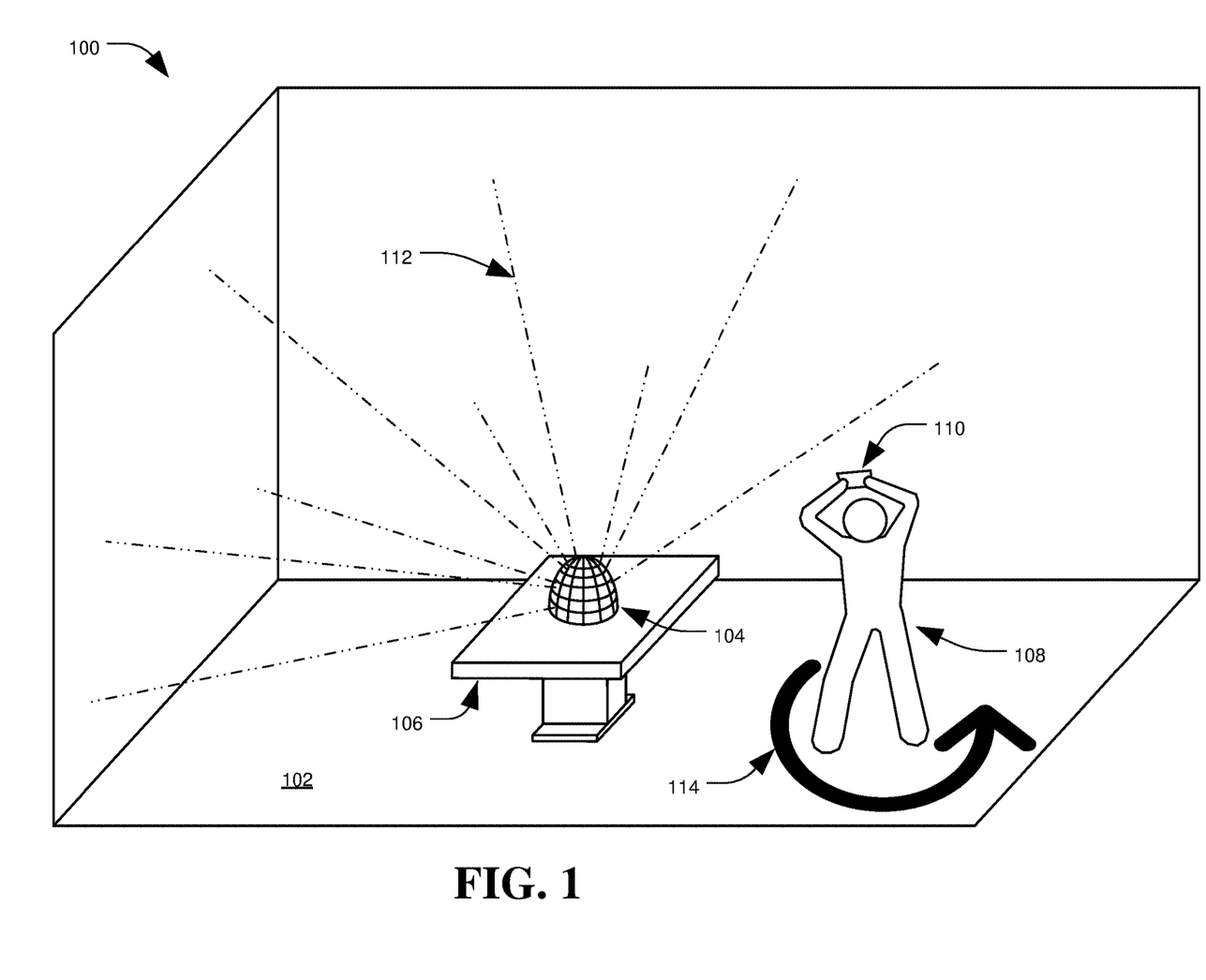
FIG. 1 depicts a diagram of an example method for three dimensional mapping, in accordance with certain embodiments of the present disclosure.

FIG. 1 depicts a diagram 100 of an example method for three dimensional mapping, in accordance with certain embodiments of the present disclosure. In particular, diagram 100 illustrates an example system for enhancing monocular SLAM application using inexpensive lasers and diffraction gratings to add artificial texture to walls and ceilings. By generating artificial and temporary texturing on the environment, the 3D mapping algorithms are provided with numerous identifiable features to track between images in a set, thereby enabling high accuracy reconstruction of an environment even with common camera equipment.

The diagram 100 may include a physical environment 102, such as an interior room. A light diffusion source or emitter 104 may be situated within the environment 102, such as by placing it on a table or stand 106 near the center of the environment 102, although the light source 104 may also be placed on the floor, suspended from the ceiling, etc. The light source 104 may emit a plurality of light beams 112, which may generate an artificial pattern of lights on the walls, floors, and ceiling of the environment 102. A camera operator 108 may then scan the environment 102 using a camera 110, such as a smartphone, for example by moving around the room in a circle or 114 or other pattern to provide a sufficient number of images to enable a SLAM algorithm to reconstruct a 3D rendering of the environment 102. The light patterns 112 generated by the light source 104 can provide the SLAM algorithms with enough feature points to lock onto and produce rich, dense point clouds and accurate pose estimations.

The light source 104 may include a laser projector, light-emitting diode (LED), an incandescent bulb, or any other light source. The light source 104 may also include a diffraction grating, textured glass or plastic, a partially opaque patterned candle or light holder, or any other element that will operate with the light to create a consistent pattern of light beams 112 that can be projected onto the environment 102, such as grids, arrays, or artistic light pattern designs. For example, consumer products for light shows, holiday displays, nightlights, or other products may be applied to generate the light textures. The light source 104 may include colored or colorless lighting. In some examples, colored laser lighting may be more easily detected by a camera in a lighted environment with light-colored walls, but other implementations can also be used.

The camera 110 may include a point and shoot camera, smartphone, tablet, webcam, or other monocular or single-directional camera. The camera 110 may be configured to store or transmit a sequence of 2D images of the environment 102 to which a SLAM or other mapping algorithm can be applied. Images may be captured as individual single shots, as a set of "streaming" images that are automatically captured in sequence, as a video file, or in other formats. In some examples, the camera 110 may be configured with software or computer instructions for generating 3D renderings of real world environments, which may operate the camera element to collect a stream of images in response to an input from a user 108. The computer instructions may then apply computer vision and 3D mapping algorithms to the set of images, to detect environmental features and generate a 3D model or rendering of the scanned environment 102.

In some examples, the camera 110 may include elements or sensors, beyond the image capture sensor, that can be applied for 3D mapping. For example, the camera 110 may include global positioning system (GPS) sensors for location tracking, accelerometers or gyroscopes for movement tracking, compass or magnet features for determining direction, or other sensors. Such positional data may be used in conjunction with the image data to determine a path, direction, and orientation (e.g., roll, pitch, and yaw) of the camera 110 while the pictures were taken, which can enable superior determinations of the environmental details. In some examples, positional data from the sensors may be stored as metadata corresponding to an image set or individual images, which can be compared to determine a path of the camera 110 for SLAM algorithms.

The camera operator 108 may include a human operator, a remote-controlled or programmed robot, or any other operator able to hold the camera 110 and move it around the environment 102. The camera operator 108 may move about the room 102, and move the camera 110, in such a way as to capture most or all of the relevant environmental features, such as vertices where walls, floors, and ceilings meet, doors, windows, and other features. The movement path 114 of the camera operator 108 may be selected so as to not position the camera operator 108 between the light source 104 and the environment 102 being photographed, so as to not obscure the light patterns 112 within the images and provide confusing results to the 3D mapping algorithm.

Projecting light patterns may improve the performance of 3D mapping algorithms by providing identifiable features and patterns between images. As explained above, 3D mapping algorithms may also operate by making assumptions about the structure of a space, such as "walls are flat planes" or "walls intersect in vertical lines." Accordingly, it becomes important to identify where walls, ceiling and floors meet. Projected light patterns may help with this detection, but may not always solve the issue, or users may be unable or unwilling to apply projected light patterns in their current environment. Accordingly, a process for improved edge or corner detection is described in regard to FIG. 2.

Figure 2:
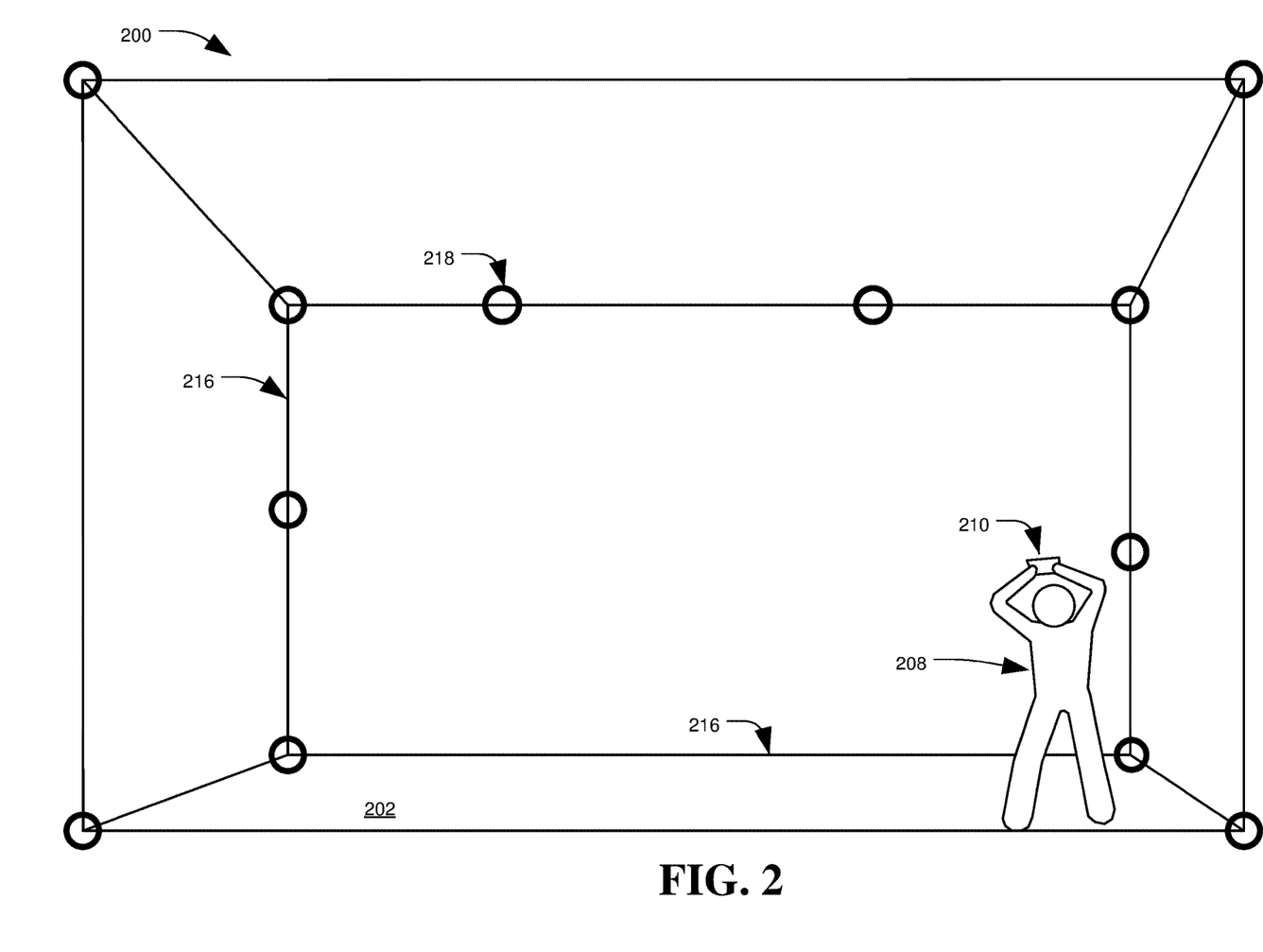
FIG. 2 depicts a diagram of an example method for three dimensional mapping, in accordance with certain embodiments of the present disclosure.

FIG. 2 depicts a diagram 200 of an example method for three dimensional mapping, in accordance with certain embodiments of the present disclosure. In particular, diagram 200 illustrates an example system for improved detection of corners, edges, or both in computer vision-aided 3D mapping. By improving a 3D mapping algorithm's ability to identify corners and edges of surface planes, the algorithm can better recreate an accurate modeling of a real-world space.

The diagram 200 may include a physical environment 202, such as an interior room. A camera operator 208 may scan the environment 202 using a camera 210, such as a smartphone, to provide a sufficient number of images to enable a SLAM algorithm to reconstruct a 3D rendering of the environment 202. The environment 202 may include edges 216 where walls, floors, ceilings, or other features meet, and which may be used by 3D mapping algorithms to generate accurate estimates of the size, distance, or orientation of features in the environment 202. To assist in identifying these edges or corners 216, a user 208 may interact with a user interface (UI) of the camera apparatus 210, for example while scanning the environment 202 with the camera 210, to identify edges, corners, or both 216. In another example, a user 208 may interact with one or more images, videos, or similar image files to identify the corners and edges 216, for example on a computer device other than the camera 210 to which the image files have been transferred. By tapping, clicking, or otherwise interacting with the UI, the user 208 may generate indicators, markers, or flags 218 specifying the location of corners or edges 216. These indicators can improve SFM/SLAM accuracy and the reliability of a 3D mapping algorithms estimates of feature boundaries and intersections in the image data, and thereby improve the 3D modeling output of the algorithms. An example UI that may be interacted with to generate indicators 218 on edges and corners 216 is shown in FIG. 3.

Figure 3:
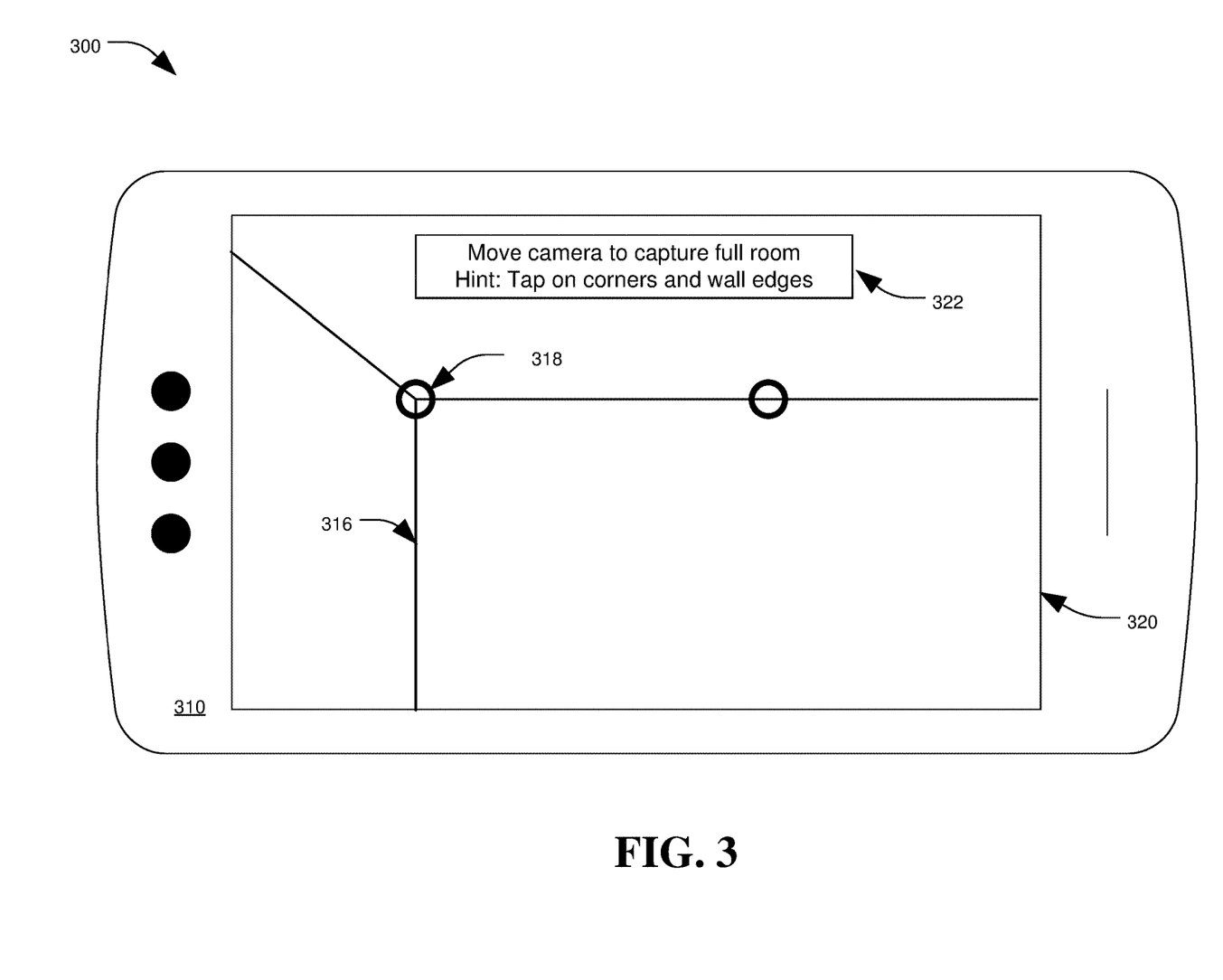
FIG. 3 depicts a diagram of an example method for three dimensional mapping, in accordance with certain embodiments of the present disclosure.

FIG. 3 depicts a diagram 300 of an example system for three dimensional mapping, in accordance with certain embodiments of the present disclosure. In particular, diagram 300 illustrates an example device and interface for identifying edges and corners in a real world environment to enable accurate 3D recreation of the environment via a mapping algorithm or program.

The diagram 300 may include a computing device 310, which may be an example of a smartphone or tablet equipped with a camera and a display screen 320. The display screen 320 may include a touch screen, providing a UI for receiving user inputs. The display screen 320 may show images or a video feed captured while scanning an environment for the purposes of generating a 3D map or model. The display screen 320 UI may display instructions or directions 322 for capturing image data for 3D mapping. The directions or instructions 322 may be generated by an application or program executing on the device 310 for 3D mapping, which may include image data capture functionality and corresponding computer vision image analysis and 3D modeling functionality. The directions or instructions 322 in the example embodiment direct a camera operator (e.g. a human user) to move the camera about the environment to capture images of the full room or other environment. The instructions 322 may also direct a user to tap the display screen 320 on portions of an image corresponding to corners and edges 316 of environmental features. Tapping the screen 320 may produce an indicator 318 that may be stored as metadata (e.g., X, Y coordinates) associated with a location in the corresponding image data, enabling a 3D mapping algorithm to recognize corner or edge elements 316 based on the indicator 318. While the computing device 310 is depicted as a smartphone, tablet, or camera with image-capture functionality, computing device 310 may also include other devices, such as a desktop or laptop computer that receives the image data to display on screen 320 from a remote camera, such as via a wired or wireless data transmission, or via data stored to a universal serial bus (USB) drive or other memory storage device. Similarly, the UI may allow for interaction using a mouse or other pointing device instead of touchscreen control.

Figure 4:
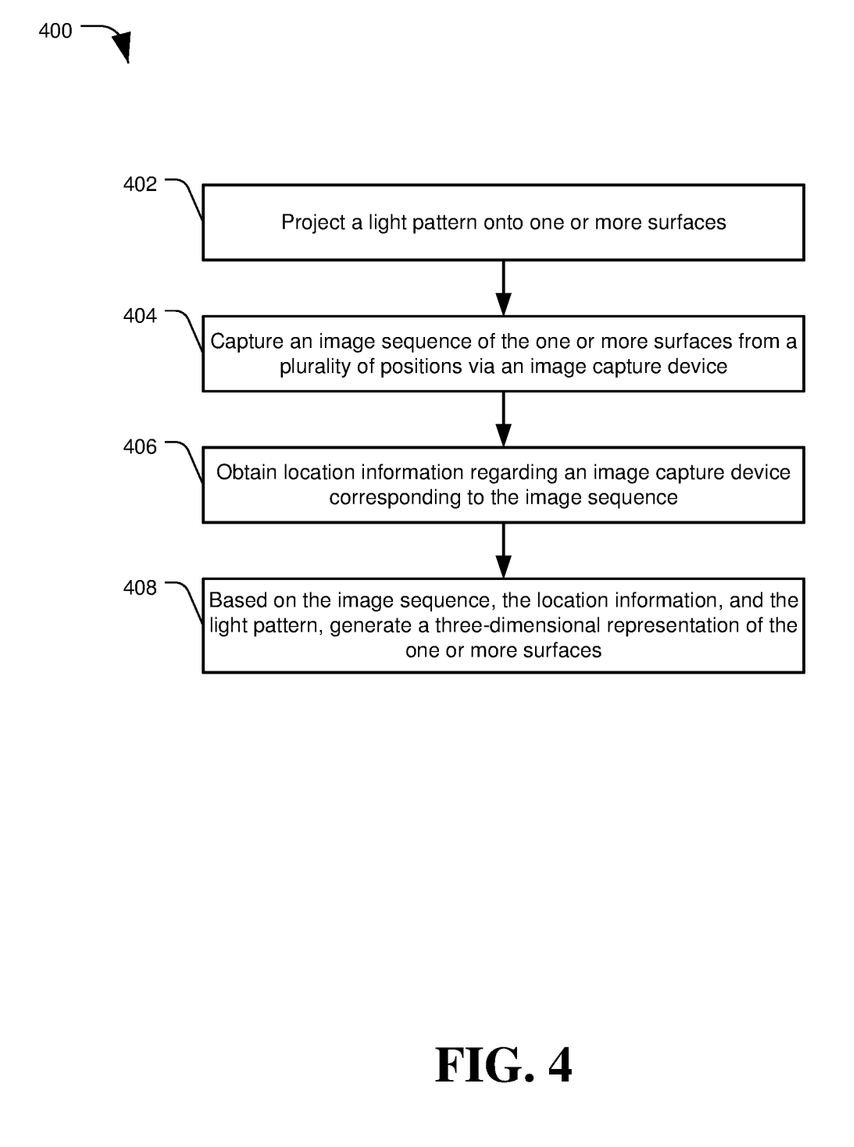
FIG. 4 depicts a flowchart of an example method for three dimensional mapping, in accordance with certain embodiments of the present disclosure.

Turning now to FIG. 4, a flowchart 400 of an example method for three dimensional mapping is shown, in accordance with certain embodiments of the present disclosure. The method may correspond to a process for improving 3D mapping via a projected light pattern, as discussed in regard to FIG. 1. The method of FIG. 4 may be implemented via a computing system, such as computing system 310 or 602, and may include inputs from a camera operator 108 or 208.

The method may include projecting a light pattern onto one or more surfaces of a physical environment, at 402. The light pattern may be produced by shining a light source through a diffraction medium, such as a textured or patterned translucent medium, that can produce a multi-point light pattern with a relatively fixed arrangement. The light pattern may be projected on any environmental surfaces, including indoor or outdoor, flat or curved, colored or colorless, at different ambient lightning levels, etc. The light coloration, intensity, and pattern may be selected or modified based on the environmental features and conditions.

At 404, the method may include capturing an image sequence of the one or more surfaces from a plurality of positions or angles via an image capture device. For example, a smartphone or tablet with camera functionality may be moved around the environment, while capturing multiple images (e.g., by capturing photographs at a selected time interval), to obtain a set of images of the one or more surfaces from multiple physical positions, locations, or angles. The images may capture the some or all of the projected light pattern.

The method may also include obtaining information regarding an image capture device corresponding to the image sequence, at 406. The information regarding the image capture device may include physical position or movement information, such as coordinate details from a GPS component of the image capture device, or movement or orientation details from accelerometers, gyroscopes, or other components. The position or motion data may optionally be stored as metadata corresponding to the sequence of images. For example, each image captured in the sequence of images may have corresponding metadata stored with it, thereby recording readings from positional components at the time the image was captured. In some examples, location information for the camera may be determined or extrapolated based on the sequence of images. An algorithm may be employed that compares the distance, size, orientation, or other changes between features depicted in multiple images in the sequence, and determines changes in camera position based on the differences in those features. For example, if the algorithm can detect the corners of a door frame in multiple images, and the door frame became larger and more offset between images, the algorithm may determine that the camera moved toward the door and laterally to a side between taking the images to produce the changes to the door frame. In some embodiments, a monocular SLAM (simultaneous localization and mapping) algorithm may be used to determine or track a camera's location in an environment based on the captured images.

Figure 5:
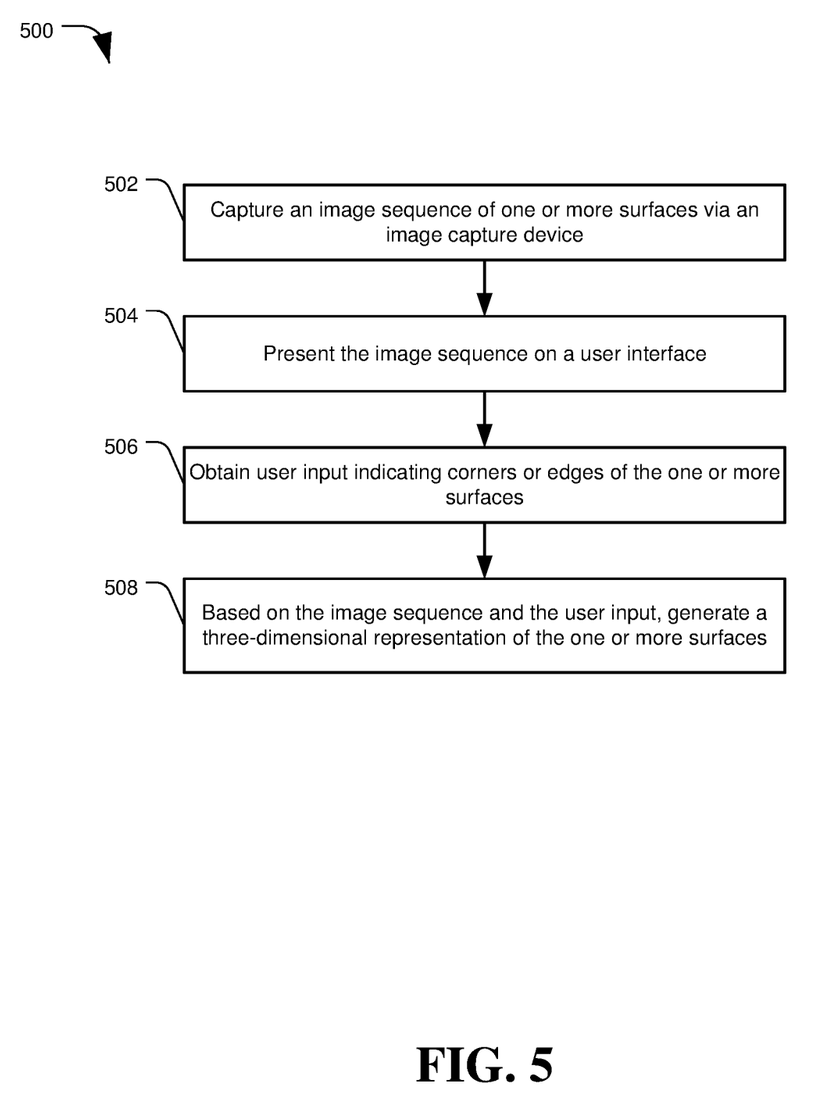
FIG. 5 depicts a flowchart of an example method for three dimensional mapping, in accordance with certain embodiments of the present disclosure.

At 408, the method may include using the image sequence and the light pattern to generate a three-dimensional representation of the one or more surfaces. In some examples, the location information for the camera may also be used to determine and generate a 3D representation of the environment. A monocular SLAM algorithm may be used to generate the three-dimensional representation. By applying a light pattern on the one or more surfaces, enough feature points may be provided to the algorithm to lock onto to produce rich, dense point clouds and accurate environmental estimations. The amount uncertainty in the environment can be greatly reduced due to the wealth of environmental features to track, greatly improving 3D mapping capabilities. The generated 3D representation of the environment can be used for numerous applications, including 3D tours for real estate, virtual reality recreations of real-world environments, architectural mapping, environmental analysis, education, or other applications. FIG. 5 presents another method for improved three dimensional mapping.

FIG. 5 depicts a flowchart 500 of an example method for three dimensional mapping, in accordance with certain embodiments of the present disclosure. In particular, the method may provide improved corner and edge detection in computer vision-aided 3D mapping, and may correspond to the diagrams of FIGS. 2 and 3. The method of FIG. 5 may be implemented via a computing system, such as computing system 310 or 602, and may include inputs from a camera operator 108 or 208.

The method may include capturing an image sequence of one or more surfaces via an image capture device, at 502. The image capture process may be similar to that discussed for 404 of FIG. 4. In particular, the image sequence may optimally capture a plurality of intersections of surfaces, such as corners or edges, within a physical environment. For example, SFM algorithms may attempt to identify corners within an image, which may enable detecting changes in perspective between images in a set to estimate motion. The image capture device or other device may present guidance or instruction to a camera operator to position the camera in such a way as to capture the corners and edges as the camera is moved about.

At 504, the method may include presenting the image sequence on a user interface. The image sequence or video stream may be presented on a screen or monitor of the image capture device, or on a separate device. For example, the image capture device may broadcast the image sequence to another device for "live" simultaneous or near simultaneous display, e.g., via wireless transmission such as Wi-Fi or Bluetooth, or via wired transmission such as ethernet or high-definition multimedia interface (HDMI) cables. In another example, the image sequence may be stored by the image capture device to a data storage device, such as a secure digital (SD) card, a Flash drive, or another memory, and then the data storage device may be connected to another computing device for display or presentation on a screen or projection.

The method may include obtaining user input indicating corners or edges of the one or more surfaces, at 506. Using a touch screen, pointing device such as a mouse pointer, or other interface, a user may "click" or "tap" on points or coordinates within the image sequence that correspond to depictions of corners, edges, or other boundaries and joints of surfaces within the physical environment. In some examples, these indicators may be reflected in the sequence of images, such as by dots or circles on the identified features. These user indicators may provide guidance to a computer vision algorithm to recognize these features as edges or corners, and to track those features within the sequence of images. In some examples, software may be presenting the sequence of images and simultaneously tracking elements within the sequence of images, and therefore features identified by a user may be marked with a visual identifier that remains on the feature between images in the sequence of images, so that a user does not need to re-identify features on each individual image in the sequence.

At 508, the method may include generating a three-dimensional representation of the one or more surfaces based on the image sequence and the user input. The 3D mapping may be performed by SLAM algorithms, augmented by the user inputs. The user input on key features may be used by the algorithm to determine spacing, size, orientation, and alignment of physical objects within the environment. In some examples, the 3D mapping may be accomplished via computer vision software that analyses the image sequence for key features and generates coordinate lists of those features, while a 3D mapping algorithm may use the coordinates to construct a 3D representation of the environment from the images. By greatly improving the confidence of the computer vision feature detection by way of the user inputs, the resultant 3D maps or models may be generated at a high level of accuracy.

It should be understood that the processes of FIGS. 4 and 5 can be used together to further improve 3D mapping performance. For example, a light pattern may be projected onto one or more surfaces in the environment to improve a computer vision system's ability to determine the relative location of points along mostly featureless surfaces. The image sequence can further be displayed and interacted with by a user to identify corners and edges within the environment. Using both the improved surface detection and tracking from the projected light pattern, and the improved corner and edge detection from the user input, optimal accuracy for 3D mapping and modeling can be achieved using inexpensive or common cameras and sensing devices, such as monocular smartphone cameras, alone or in conjunction with consumer laptops or other computing devices. An example computing system used to perform three dimensional mapping, as in the examples discussed herein, is described in regard to FIG. 6.

Figure 6:
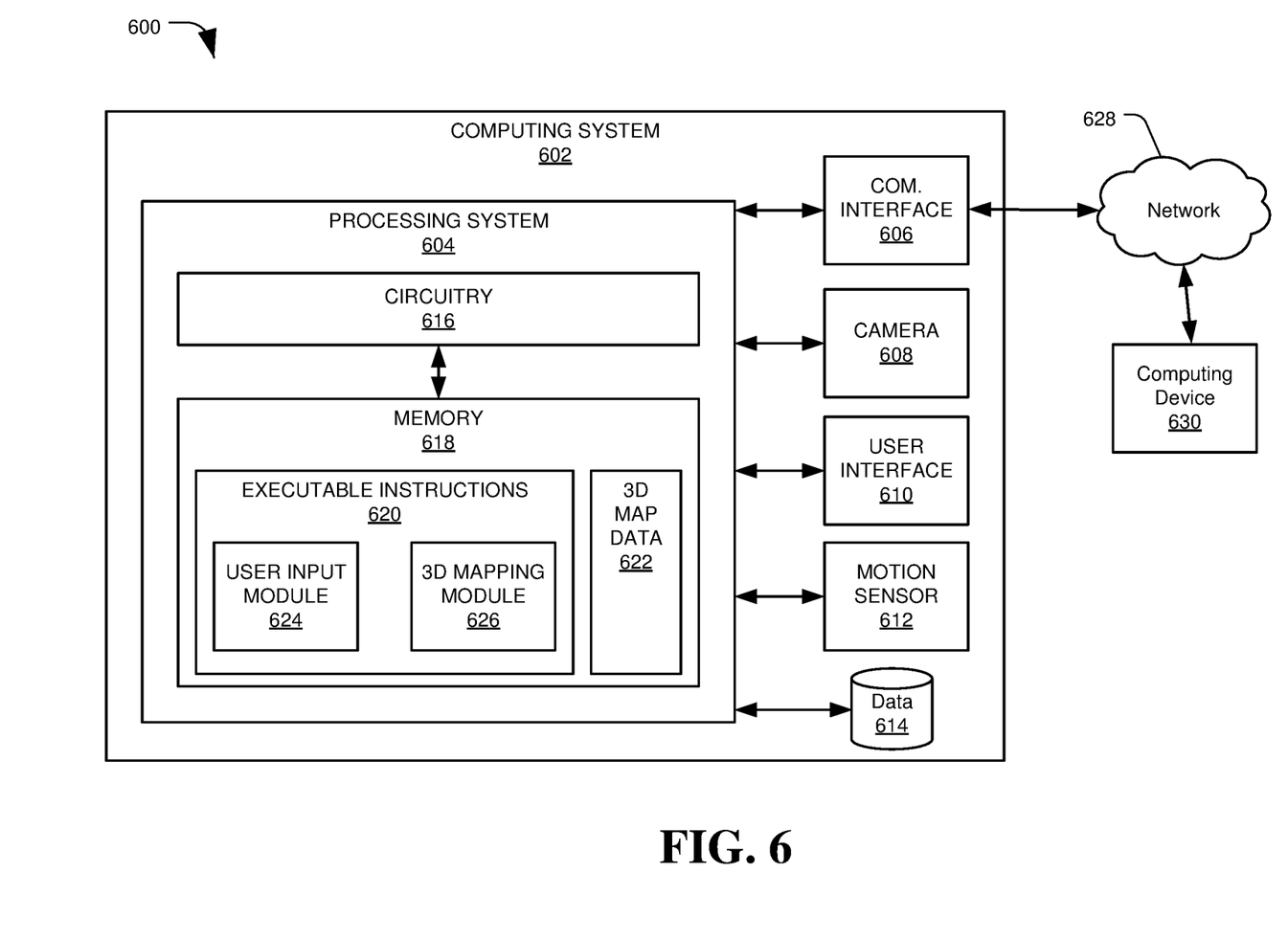
FIG. 6 depicts a diagram of a system configured for three dimensional mapping, in accordance with certain embodiments of the present disclosure.

FIG. 6 is a diagram of a system 600 configured for three dimensional mapping, in accordance with certain embodiments of the present disclosure. In particular, FIG. 6 depicts a computer system 602, which may be an example of any computing system that is configured to perform the operations of image capture devices or cameras 110, 210, or 310, and to perform elements of the methods of FIGS. 4 and 5. Computing system 602 may include a processing system 604, a communication interface 606, a camera element 608, a user interface 610, a motion sensing element 612, and a data storage system 614. Computing system 602 may include other components such as a power source and enclosure that are not shown for clarity. Computing system 602 may comprise one or more smartphones, tablets, digital cameras, server computing systems, desktop computing systems, laptop computing systems, or any other computing system, including combinations thereof. In some examples, system 600 may include a network 628 and a computing device 630. Computing system 602 and computing device 630 may exchange communications via network 628 to perform the operations described herein, such as the elements of the methods of FIGS. 4 and 5. Computing system 630 may be any type of computing device, such as those described above for computing system 602. Network 628 may be any type of wired or wireless network, and may include switches, routers, or other components to implement the network 628.

Communication interface 606 may comprise components, such as transceivers, that communicate over communication links, such as network cards, ports, radio frequency (RF), processing circuitry and software, or any other communication devices. Communication interface 606 may be configured to communicate over metallic, wireless, or optical links. Communication interface 606 may be configured to use Time Division Multiplex (TDM), Internet Protocol (IP), Ethernet, optical networking, wireless protocols, communication signaling, other communication formats, or any combinations thereof. In particular, communication interface 606 may be configured to enable communications over network 628 with other computing device(s) 630.

Camera 608 may include an optical instrument configured to capture a visual image, particularly in a digital format, which, in conjunction with processing system 604, may be stored to a memory such as data storage device 614. The camera 608 may include a monocular camera, or multiple offset optical capture elements. In some examples, camera 608 may include light or laser projection elements, such as flash or LIDAR elements.

User interface 610 may comprise components that can receive user inputs and present media or other information to a user. User interface 610 may include a display screen, touch screen, touch pad, keyboard, buttons, speaker, microphone, pointer device or interface, communication port, other user input/output apparatus, or any combination thereof.

Motion sensor 612 may include one or more elements configured to detection movement or position of the computing system 602. Motion sensor 612 may include a global positioning system (GPS) receiver, an accelerometer, a gyroscope, or other motion or position detection elements. The data generated by the motion sensor 612 may be stored to memory 618 or data storage device 614, transmitted via communication interface 606, or displayed via user interface 610. In some examples, the processing system 604 may be configured to store position information from motion sensor 612 as metadata associated with images captured by camera 608.

Data storage system 614 may include any combination of nonvolatile and volatile memory, such as one or more hard disk drives, NAND solid-state memory, DRAM (dynamic random access memory), or other memory system. Data storage system 614 may include internal processors or controllers for performing data storage and retrieval operations based on commands received from processing system 604.

Processing system 604 may be linked to communication interface 606, camera 608, user interface 610, motion sensor 612, and data storage system 614. Processing system 604 can include processing circuitry 616 and memory device 618. Memory device 618 can store executable instructions or other operating software 620, and 3D map data 622. The executable instructions may include a user input module 624 and a 3D mapping module 626.

Processing circuitry 616 may comprise a microprocessor and other circuitry that can retrieve and execute instructions 620 from memory device 618. Memory 618 may comprise a non-volatile data storage medium, such as a disk drive or solid state drive, or volatile memory such as random access memories (RAM) and dynamic RAM (DRAM), including combinations thereof. Some data or programs may be loaded from data storage system 614 into memory 618 based on instructions from processing system 604. Data or instructions may also be loaded into memory 618 from communication interface 606 or user interface 610. Processing circuitry 616 may be mounted on a circuit board that may also hold memory device 618 and portions of communication interface 606, camera 608, user interface 610, motion sensor 612, and data storage system 614.

Executable instructions 620 may comprise computer programs, firmware, or some other form of machine-readable processing instructions. Executable instructions 620 may include user input module 624, and 3D mapping module 626, although related operations may be handled by multiple different modules or programs, and additional or different modules may be included in executable instructions 620. Executable instructions 620 may further include an operating system, utilities, drivers, network interfaces, applications, or other types of software. When executed by processing circuitry 616, executable instructions 620 may direct processing system 604 to operate computing system 602 as described herein.

User input module 624 may be a set of instructions for presenting and receiving information via interface elements of computing system 602. User input module 624 may include instructions for an app or program configured for capturing a sequence of images for use in generating three dimensional mapping. User input module 624 may operate with user interface 610 and camera 608 to present a graphical UI to a user, and based on the user input the user input module 624 may operate the camera 608 to capture a sequence of individual images or streaming image data, which may be processed by circuitry 616 and stored to memory 618 or data storage 614. Additionally, user input module 624 may be configured to receive user inputs via user interface 610 that indicate where elements such as edges and corners of physical space objects are depicted within the captured image data. These indicators may be stored as metadata with individual images, or the indicators may be tracked between a plurality of images or streaming image data. Once 3D mapping data has been generated from the sequence of captured images (e.g., via 3D mapping module 626), user input module 624 may present the 3D map or model data via user interface 610. The user input module 624 may be configured to enable a user to manipulate the 3D mapping data, such as by rotating, zooming, or panning a view of the mapped data.

User input module 624 include a computer vision algorithm or instructions, that may analyze image data from camera 608 to identify feature points, track movement or persistence of features between images, or otherwise identify relevant aspects of the images. The functioning of the computer vision algorithm may be improved via a projected light pattern providing additional and clearly identifiable feature points even on featureless surfaces, or by user indicators identifying feature points such as edges and corners. In other examples, the computer vision analysis of image data may be performed by 3D mapping module 626.

3D mapping module 626 may include a set of instructions for using a set of feature points from a sequence of images to determine a layout of a physical environment in which the images were taken, and to generate a 3D map or module of the environment. The instructions may also be used to determine a location and movement of a camera 608 as the sequence of images were taken. The instructions and techniques employed by the 3D mapping module 626 can include simultaneous localization and mapping (SLAM), visual SLAM (vSLAM), and structure-from-motion (SFM), to estimate a 3D structure of an environment from the sequence of 2D images. The 3D mapping module 626 may make calculations regarding size, shape, and distance of objects based on changes in feature points between images, and may also make estimates regarding how surfaces connect and are oriented to generate 3D maps or models in the absence of definitive data. By applying the methods and systems described herein, the performance of the 3D mapping module may be improved by projecting light patterns within the physical environment to increase the number, quality, and certainty of feature points within the images. Similarly, user indicators of where features such as corners or edges of objects can improve the certainty of feature points, and thereby improve the estimates and calculations of the 3D mapping module 626.

The output of the 3D mapping module 626 may include 3D map data 622, which may be files, coordinates, models, or other data structures which can be used to render a digital, virtual recreation of the physical location depicted in the sequence of images. The 3D map data may be stored to memory 618 or data storage 614, transferred via communication interface 606, presented (e.g., via user input module 624) on user interface 610, or any combination thereof. The 3D mapping data 622 may be used to generate interactive virtual property tours, virtual reality recreations, 3D printable models, or for a variety of other applications.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Steps depicted in the flowcharts may optionally be excluded, added, performed in a different order, or performed with different degrees of concurrency than shown (e.g., steps depicted as sequential may be performed concurrently). Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A method comprising:
executing a three dimensional mapping operation via a computing system, including:
capturing an image sequence of a plurality of physical surfaces via an image capture device;
receiving a user input corresponding to the image sequence, the user input identifying a location of a surface edge from the plurality of physical surfaces by placing an indicator of the location of the surface edge in the image sequence;
tracking a plurality of feature points between individual images in the image sequence based on a projected light pattern situated to create a consistent artificial texture pattern on the plurality of physical surfaces; and
generating a three dimensional map of the plurality of physical surfaces based on the image sequence, the user input identifying the location of the surface edge, and the plurality of feature points.

2. The method of claim 1 further comprising:
generating the three dimensional map includes:
identifying a feature point in a first image of the image sequence;
identifying the feature point in a second image of the image sequence; and
determining motion of the image capture device based on a difference in position between the feature point in the first image and the feature point in the second image.

3. The method of claim 2 further comprising:
determining the motion of the image capture device via application of a simultaneous localization and mapping (SLAM) algorithm.

4. The method of claim 1 further comprising:
generating the three dimensional map via application of a structure from motion (SfM) algorithm.

5. The method of claim 1 further comprising:
obtaining location information based on a position sensor for the image capture device; and
generating the three dimensional map further based on the location information.

6. The method of claim 5 further comprising the location information includes global positioning system (GPS) coordinates.

7. The method of claim 5 further comprising the position sensor includes an accelerometer.

8. The method of claim 5 further comprising the position sensor includes a gyroscope.

9. The method of claim 1 further comprising:
the computing system includes a smartphone incorporating the image capture device;
displaying the image sequence on a screen of the smartphone; and
the user input includes tap inputs on the screen corresponding to a location of the surface edge in a currently displayed image of the image sequence.

10. A memory device storing instructions that, when executed, cause a processor to perform a method comprising:
generating a three dimensional map of a physical space, including:
capturing an image sequence of a plurality of physical surfaces via an image capture device;
tracking a plurality of feature points between individual images in the image sequence based on a projected light pattern situated to create a consistent artificial texture pattern on the plurality of physical surfaces; and
generating the three dimensional map of the plurality of physical surfaces based on the image sequence and the plurality of feature points.

11. The memory device of claim 10 storing the instructions that, when executed, cause the processor to perform the method further comprising:
receiving a user input corresponding to the image sequence, the user input identifying a location of a surface edge from the plurality of physical surfaces by placing an indicator of the location of the surface edge in the image sequence; and
generating the three dimension map further based on the user input.

12. The memory device of claim 10 storing the instructions that, when executed, cause the processor to perform the method further comprising:
generating the three dimensional map further includes:
identifying a feature point, from the plurality of feature points, in a first image of the image sequence;
identifying the feature point in a second image of the image sequence, the second image captured from a different physical position than the first image; and
generating a recreation of the physical space based on a difference in position between the feature point in the first image and the feature point in the second image.

13. The memory device of claim 12 storing the instructions that, when executed, cause the processor to perform the method further comprising:
generating the three dimensional map via application of a structure from motion (SfM) algorithm.

14. The memory device of claim 12 storing the instructions that, when executed, cause the processor to perform the method further comprising:
presenting a user interface on a touchscreen device;
operating the image camera device in response to a user instruction received via the user interface; and
capturing the image sequence as a set of streaming images automatically captured in sequence.

15. The memory device of claim 10 storing the instructions that, when executed, cause the processor to perform the method further comprising:
obtaining location information based on a position sensor for the image capture device; and
generating the three dimensional map further based on the location information.

16. An apparatus comprising:
a processor configured to execute a three dimensional mapping operation, including:
capture an image sequence of a plurality of physical surfaces via an image capture device;
receive a user input corresponding to the image sequence, the user input identifying a location of a surface edge from the plurality of physical surfaces by placing an indicator of the location of the surface edge in the image sequence;
track a plurality of feature points between individual images in the image sequence based on a projected light pattern situated to create a consistent artificial texture pattern on the plurality of physical surfaces; and
generate a three dimensional map of the plurality of physical surfaces based on the image sequence, the user input, and the plurality of feature points.

17. The apparatus of claim 16 further comprising:
a mobile computing device including:
the processor;
the image capture device; and
a position sensor configured to generate location information for the mobile computing device; and
the processor is further configured to generate the three dimensional map further based on the location information.

18. The apparatus of claim 17 further comprising:
the position sensor includes at least one of a global positioning system (GPS) sensor, an accelerometer, and a gyroscope.

19. The apparatus of claim 16 comprising the processor further configured to:
generate the three dimensional map, including:
identify a feature point in a first image of the image sequence based on the user input;
identify the feature point in a second image of the image sequence;
determine motion of the image capture device based on a difference in position between the feature point in the first image and the feature point in the second image; and
determine a position of the plurality of physical surfaces based on the motion of the image capture device and the sequence of images.

20. The apparatus of claim 16 comprising the processor further configured to:
determine the motion of the image capture device via application of a simultaneous localization and mapping (SLAM) algorithm; and
generate the three dimensional map via application of a structure from motion (SfM) algorithm.

* * * * *